United States Patent
Hao

(10) Patent No.: US 10,985,812 B2
(45) Date of Patent: Apr. 20, 2021

(54) METHOD FOR NON-LINEAR PRE-CODING BASED ON CSI ACCURACIES, CORRESPONDING NETWORK DEVICE AND COMPUTER READABLE STORAGE MEDIUM

(71) Applicant: Nokia Technologies OY, Espoo (FI)

(72) Inventor: Jinping Hao, Shanghai (CN)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 16/959,324

(22) PCT Filed: Jan. 2, 2019

(86) PCT No.: PCT/EP2019/050042
§ 371 (c)(1),
(2) Date: Jun. 30, 2020

(87) PCT Pub. No.: WO2019/134919
PCT Pub. Date: Jul. 11, 2019

(65) Prior Publication Data
US 2020/0358492 A1   Nov. 12, 2020

(30) Foreign Application Priority Data
Jan. 4, 2018 (CN) .......................... 201810009153.0

(51) Int. Cl.
| H04B 7/02 | (2018.01) |
| H04B 7/0456 | (2017.01) |
| H04B 7/06 | (2006.01) |
| H04L 5/00 | (2006.01) |

(52) U.S. Cl.
CPC ......... H04B 7/0456 (2013.01); H04B 7/0626 (2013.01); H04B 7/0639 (2013.01); H04L 5/0023 (2013.01)

(58) Field of Classification Search
CPC .. H04B 7/0456; H04B 7/0626; H04B 7/0639; H04L 5/0023
(Continued)

(56) References Cited

U.S. PATENT DOCUMENTS

2011/0237282 A1   9/2011  Geirhofer et al.
2016/0227424 A1   8/2016  Chen et al.
(Continued)

FOREIGN PATENT DOCUMENTS

| CN | 101411110 A | 4/2009 |
| CN | 103166688 A | 6/2013 |
(Continued)

OTHER PUBLICATIONS

International Search Report for International Application PCT/EP2019/050042 dated Feb. 25, 2019.
(Continued)

*Primary Examiner* — Zewdu A Kassa
(74) *Attorney, Agent, or Firm* — Harness, Dickey & Pierce, P.L.C.

(57) ABSTRACT

Embodiments of the present disclosure relate to a method for precoding, a network device and a computer readable storage medium. For example, at a network device configured with a plurality of antennas and configured to operate in a plurality of frequency bands, channel state information (CSI) and an indication of a plurality of CSI accuracies corresponding to the CSI are obtained from a plurality of terminal devices. The bandwidth of the plurality of frequency bands is divided into one or more frequency band ranges based on comparison of each CSI accuracy with a first threshold accuracy, and ordering and precoding are performed, based on the CSI, on a plurality of data to be transmitted to the plurality of terminal devices within each frequency band range. Within each frequency band range,
(Continued)

the plurality of precoded data is transmitted to the plurality of terminal devices via the plurality of antennas.

32 Claims, 3 Drawing Sheets

(58) Field of Classification Search
USPC ................ 375/267, 260, 259, 316, 219, 295
See application file for complete search history.

(56) References Cited

U.S. PATENT DOCUMENTS

2016/0249244 A1    8/2016   Xia et al.

2016/0344458 A1*  11/2016   Zhao .................... H04B 7/0456

FOREIGN PATENT DOCUMENTS

| | | |
|---|---|---|
| CN | 103368684 A | 10/2013 |
| CN | 103609053 A | 2/2014 |
| CN | 106537974 A | 3/2017 |
| WO | WO-2016/168128 A1 | 10/2016 |
| WO | WO-2017/171507 A1 | 10/2017 |

OTHER PUBLICATIONS

Office Action issued Jan. 12, 2021 in Chinese Application No. 201810009153.0.

* cited by examiner

METHOD FOR NON-LINEAR PRE-CODING BASED ON CSI ACCURACIES, CORRESPONDING NETWORK DEVICE AND COMPUTER READABLE STORAGE MEDIUM

This application is a national phase under 35 U.S.C. § 371 of PCT International Application No. PCT/EP2018/050042 which has an International filing date of Jan. 2, 2019, which claims priority to Chinese Patent Application No. 201810009153.0 filed Jan. 4, 2018, the entire contents of each of which are hereby incorporated by reference.

FIELD

Embodiments of the present disclosure generally relate to communication technology, and more specifically, to a method for pre-coding, a network device and a computer readable storage medium.

BACKGROUND

In current cellular systems, multi-user/multi-stream communication typically employs linear precoding techniques. However, in many cases, non-linear precoding (NLP) can provide better performance than linear precoding, especially in those scenarios that the channels of user equipment (UE) are spatially correlated. Thus, NLP has been regarded as an important solution for 5G new radio (NR) system and discussed extensively in the third generation partnership project (3GPP) standardization meetings.

An NLP technique known as a dirty paper coding (DPC) technique has been proposed. Although this technique can achieve better performance, it is not practical since its implementation process is too complex. Another NLP technique known as Tomlinson-Harashima (THP) precoding technique has suboptimal performance but less implementation complexity compared with DPC technique.

The performance of the THP precoding technology depends on the ordering of user data when the base station (BS) performs pre-coding processing. However, the process of finding the optimal user ordering is generally highly complex. An ideal manner is to find the optimal ordering by exhausting all the orderings, which is undoubtedly rather complicated and difficult to implement. A simple ordering approach is the direct ordering based on the magnitudes of channel gains of UEs. This approach can greatly reduce the complexity and be easily implemented, but has significant performance degradation compared with the optimal ordering. It is proposed to apply the "best first" ordering approach used in V-BLAST to THP. But, this approach still has high complexity.

Therefore, there is a need to design an effective and efficient implementation for the precoding technique for use in NR systems.

SUMMARY

In general, embodiments of the present disclosure provide a method for pre-coding, a network device and a computer readable storage medium.

In a first aspect, embodiments of the present disclosure provide a method implemented at a network device configured with a plurality of antennas and configured to operate in a plurality of frequency bands. The method comprises: obtaining channel state information (CSI) from a plurality of terminal devices and an indication of a plurality of CSI accuracies corresponding to the CSI; dividing a bandwidth of the plurality of frequency bands into one or more frequency band ranges based on comparison of each of the plurality of CSI accuracies and a first threshold accuracy; performing, based on the CSI, ordering and non-linear precoding of a plurality of data to be transmitted to the plurality of terminal devices within each of the frequency band ranges; and transmitting the plurality of precoded data to the plurality of terminal devices via the plurality of antennas within each of the frequency band ranges.

In a second aspect, embodiments of the present disclosure provide a network device configured with a plurality of antennas. The network device comprises: a receiver configured to obtain channel state information (CSI) from a plurality of terminal devices and an indication of a plurality of CSI accuracies corresponding to the CSI; a controller configured to: divide a bandwidth of the plurality of frequency bands into one or more frequency band ranges based on comparison of each of the plurality of CSI accuracies and a first threshold accuracy, and perform, based on the CSI, ordering and non-linear precoding of a plurality of data to be transmitted to the plurality of terminal devices within each of the frequency band ranges; and a transmitter configured to transmit, within each of the frequency band ranges, the plurality of precoded data to the plurality of terminal devices via the plurality of antennas.

In a third aspect, embodiments of the present disclosure provide a device, comprising: a processor; and a memory including instructions which, when executed by the processor, cause the network device to perform the method according to the first aspect.

In a fourth aspect, embodiments of the present disclosure provide a computer readable storage medium comprising a computer program stored thereon. The computer program contains instructions which, when executed by a processor, cause the processor to perform the method according to the first aspect.

It is to be understood that the content described in the Summary is not intended to identify key features or essential features of the present disclosure, nor is it intended to be used to limit the scope of the present disclosure. Other features of the present disclosure will be more comprehensible with the following depiction.

BRIEF DESCRIPTION OF THE DRAWINGS

Through the following detailed description with reference to the accompanying drawings, the above and other features, advantages and aspects of embodiments of the present disclosure will become more apparent. In the drawings, the same or similar reference symbols refer to the same or similar elements, in which.

DETAILED DESCRIPTION OF EMBODIMENTS

Figure 1:
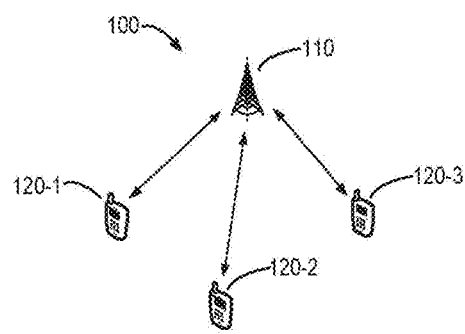
FIG. 1 illustrates an example communication network in which embodiments of the present disclosure may be implemented.

Embodiments of the present disclosure will be described in the following in more details with reference to the drawings. Although some embodiments of the present disclosure are displayed in the drawings, it is to be understood that the present disclosure may be implemented in various manners, not limited to the embodiments illustrated herein. On the contrary, these embodiments are provided to make the present disclosure more thorough and complete. It is to be understood that the drawings of the present disclosure and embodiments thereof are only for the purpose of illustration, without suggesting any limitation to the protection scope of the present disclosure.

As used herein, the term "network device" refers to a base station or other entities or nodes having particular functions in communication network. "Base station" (BS) may represent a node B (Node B or NB), an evolving node B (eNodeB or eNB), a remote radio unit (RRU), a radio head (RH), a remote radio head (RRH), a relay, a low power node, such as pico base station, femto base station and the like.

The term "terminal device" or "user equipment" (UE) as used herein refers to any terminal device that can communicate wirelessly with the base station or with each other. As an example, the terminal device may include a mobile terminal (MT), subscriber station (SS), a portable subscriber station (PSS), a mobile station (MS), or an access terminal (AT), and the above devices onboard.

As used herein, the term "data" refers to any suitable information, including user data, control signal, broadcast information and so on.

As used herein, the term "includes" and its variants are to be read as open-ended terms that mean "includes, but is not limited to". The term "based on" is to be read as "based at least in part on". The term "one embodiment" is to be read as "at least one embodiment"; the term "another embodiment" is to be read as "at least one another embodiment". The following text may also contain relevant definitions of other terms.

As described above, it has been proposed that the NLP technique be used in the next-generation cellular system to improve the system performance. For both the THP technique and the DPC technique, although the performance of the THP technique is sub-optimal than that of the DPC technique, the THP technique is more implementable. Moreover, when the THP technique is used at a BS side for pre-coding, if UE data can be ordered properly, the performance can be typically improved. For example, ideally, if all the candidate orderings can be exhausted, the ordering for the optimal performance can be found definitely. However, this approach is infeasible due to too high complexity.

A simple ordering approach is to directly order data of the terminal devices based on the magnitudes of channel gains of the respective terminal devices. For example, data of the terminal device with the smallest channel gain is listed at the top, and data of the terminal device with the greatest channel gain is listed at the bottom. This ordering approach is less complex but has significant performance degradation compared with the optimal ordering. Another approach is to apply "best first" algorithm originally used for V-BLAST detection algorithm to the ordering process. Although this approach has better performance, the complexity is still high. So far, the THP pre-coding technique is still not applicable to the cellular system due to relatively complex non-linear processing. Therefore, an effective and efficient implementation should be designed for the pre-coding technique.

It has been realized by the inventor that during the process of performing pre-coding, data may be ordered based on a single frequency band in the operating bandwidth or on the whole operating bandwidth. In the context of the present disclosure, the frequency band may be of any suitable width. Only for the purpose of illustration, some embodiments will be described by taking a sub-band as a frequency band.

It has also been realized by the inventor that the data is ordered in a narrower frequency band, and therefore the terminal device feeds a higher CSI accuracy back, and the the system performance will be better. However, it is impractical to fixedly adopt CSI feedback with the high accuracy and ordering based on a single frequency band. This is because the CSI feedback with the high accuracy needs to occupy a large amount of system resources and results in huge feedback overhead; while the implementation complexity of ordering based on single frequency band is high.

To this end, embodiments of the present disclosure provide a leveled ordering scheme in which the ordering levels are configured based on the CSI accuracies reported by the terminal devices. Specifically, the network device receives channel state information (CSI) and an indication of the plurality of CSI accuracies corresponding to these CSI from a plurality of terminal devices. Based on these CSI accuracies, the network device divides the overall operating bandwidth into one or more frequency band ranges. Further, the network device performs ordering and non-linear precoding of data to be transmitted in each frequency band range and transmits the precoded data to these terminal devices via a plurality of antennas.

For example, when the CSI accuracy level fed back by the terminal device is high, the network device may configure a broader frequency band, such as full frequency band. When the CSI accuracy levels fed back by the terminal devices are low, the network device may configure a narrower frequency band, such as a single frequency band. This configuration process may enable the system to achieve good performance under any CSI accuracy level so as to deal with the tradeoff between performance and complexity (including system overhead).

FIG. 1 illustrates an example communication network 100 in which embodiments of the present disclosure may be implemented. The communication network 100 comprises a network device 110 and three terminal devices 120-1, 120-2 and 120-3 (collectively referred to as a terminal device 120). The terminal device 120 may communicate with the network device 110 or other terminal devices via the network device 110. It is to be understood that the number of network devices and terminal devices shown in FIG. 1 is only for the purpose of illustration without any limitation. The communication network 100 may comprise any suitable number of network devices and terminal devices.

The communication in the communication network 100 may follow any suitable wireless communication technology and the corresponding communication standards. Examples of the communication technology include, but are not limited to, long term evolution (LTE), LTE-Advanced (LTE-A), Wideband Code Division Multiple Access (WCDMA), Code Division Multiple Access (CDMA), Global System for Mobile Communications (GSM), Orthogonal Frequency Division Multiplexing (OFDM), Wireless Local Area Network (WLAN), Worldwide Interoperability for Microwave Access (WiMAX), Bluetooth, Zig-Bee, machine type communication (MTC), D2D, or M2M and the like. Moreover, the communication may be performed according to any suitable communication protocol, including but not limited to, Transmission Control Protocol (TCP)/Internet Protocol (IP), Hyper Text Transfer Protocol (HTTP), User Datagram Protocol (UDP), Session Description Protocol (SDP) and the like.

In various embodiments of the present disclosure, the network device 110 is configured with a plurality of antennas and operates on a plurality of frequency band. On these frequency bands, the network device 110 transmits data to a plurality of terminal devices 120 through a plurality of antennas. Before the data is transmitted, the network device 110 performs ordering and precoding on the data to reduce influence of channel attenuation and noise so as to improve the system performance.

Figure 2:
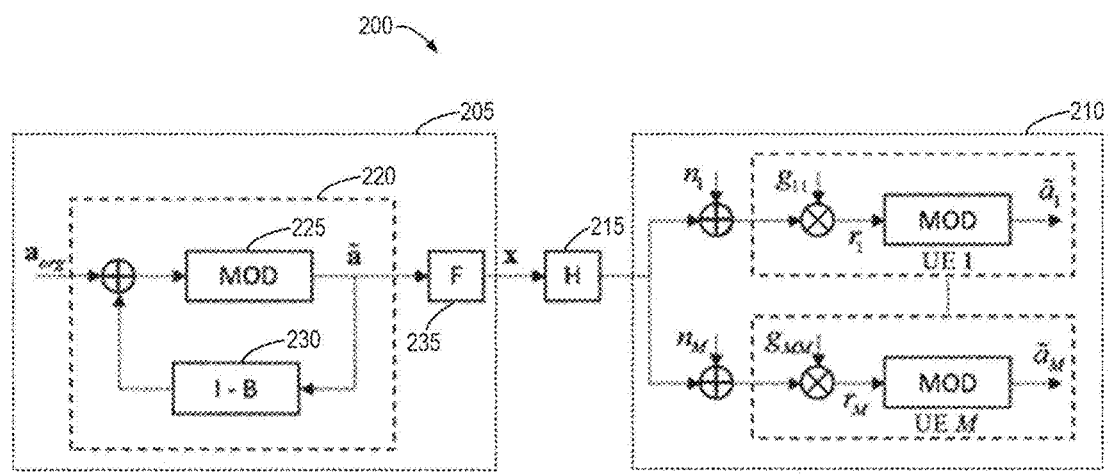
FIG. 2 illustrates example processing of a network device and a terminal device in accordance with some embodiments of the present disclosure.

FIG. 2 shows an example operation process 200 of network device 110 and terminal device 120 when precoding is used, where block 205 represents processing at the the network device 110, and the block 210 represents processing at the terminal device 120. In this example, the network device 110 has $N_t$ antennas, and $N_t$ is a positive integer greater than 1. The network device 110 transmits data signals to M terminal devices 120 through these antennas. For the sake of simplicity, each terminal device 120 is equipped with a signal antenna.

As shown in FIG. 2, at the network device 110 (block 205), after the precoding processing of a data vector $a \in C^{M \times 1}$ to be transmitted to M terminal devices 120, data $x \in C^{N_t \times 1}$ is obtained. The signal $r \in C^{M \times 1}$ received at the receiving device 120 may be represented as:

$$r = Hx + n \quad (1)$$

where $H \in C^{M \times N_t}$ (block 215) is a matrix of channel characteristics including M channel vectors of M terminal devices, while $n = [n_1, \ldots, n_M]^T$ represents the noise.

The signal received at the ith UE is represented as $r_i$:

$$r_i = h^i x + n_i \quad (2)$$

where $h^i$ denotes the ith row of H.

Figure 3:
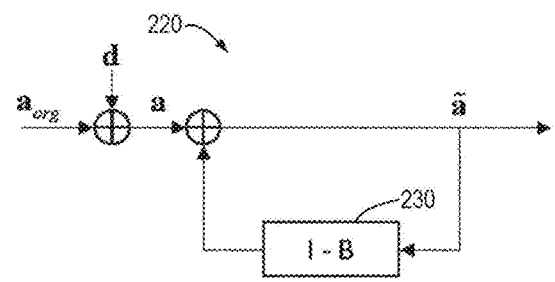
FIG. 3 illustrates example processing of a network device in accordance with some embodiments of the present disclosure.

In various embodiments of the present disclosure, the network device 110 can obtain channel state information (CSI) from the terminal device 120. With the obtained CSI, the network device 110 can perform precoding processing as shown in block 205 on the data to be transmitted to the terminal device 120. Specifically, at block 220, the original data vector $a_{org}$ is processed before the precoding. FIG. 3 shows an equivalent process of this processing. At block 225, a modularization process ("MOD") is first performed, which is equivalent to adding an additional data vector d to the original data vector $a_{org}$ as shown in FIG. 3, that is, $a = a_{org} + d$.

At block 230, feedback processing is applied to the data vector a using a feedback processing matrix B. In this example, the matrix B is designed to be a strictly lower triangular matrix with all the main diagonals being 1. Then, a vector ã is given by:

$$\tilde{a} = a + (I - B)\tilde{a} = B^{-1}a \quad (3)$$

Before the data is transmitted, at block 235, the precoding processing is performed with a precoding matrix F.

At the receiving end, the signal received using a receiving scaling matrix $G = [g_{11}, \ldots, g_{MM}]T$ (where $g_{ii}$, $i = 1, \ldots, M$, represents the receiving coefficient of the ith terminal device 120) may be represented as:

$$r = GHFB^{-1}a + Gn \quad (4)$$

where $r = [r_1, r_2, \ldots, r_M]^T$ represents the combination of receiving signals at the M terminal devices 120.

Generally speaking, the key of performing the precoding processing is to find proper G, F and $B^{-1}$ so that the terminal device 120 can eliminate the influence of the channel and recover the data a when receiving the data. For example, LQ decomposition of H may be applied to design the precoding matrix F and the feedback processing matrix B.

Specifically, LQ decomposition of H is given as: H=LQ, where L is a lower triangular matrix and Q is a unitary matrix. The diagonal element in L may be scaled to 1 using the scaling matrix G, that is, $G = \text{diag}[l_{11}^{-1}, l_{22}^{-1}, \ldots, l_{MM}^{-1}]$. Let the precoding matrix F=Q' and the feedback processing matrix B=GL, then the received signal can be changed as:

$$r = GHFB^{-1}a + Gn \quad (5)$$
$$= GLQQ'(GL)^{-1}a + Gn$$
$$= a + Gn$$

It can be seen that if the orderings of channel vectors of the individual terminal devices 120 in the matrix of channel characteristics H are different, different lower triangular matrices L and unitary matrices Q can be obtained. Moreover, as the receiving error item is represented as Gn, the receiving SNR is determined by the receiving scaling matrix $G = \text{diag}[l_{11}^{-1}, l_{22}^{-1}, \ldots, l_{MM}^{-1}]$. Therefore, different orderings of terminal devices will result in different system performance.

In various embodiments of the present disclosure, the network device 110 employs leveled ordering, that is, determining the frequency range for performing the ordering based on accuracies of the CSI fed back by the individual terminal devices 120. For example, when a level of the CSI accuracies fed back by the terminal devices 120 is low, the network device 110 may configure the ordering based on a narrower frequency band (for example, on one frequency band), thereby improving the system performance. When the level of the CSI accuracies fed back by the terminal devices 120 is higher, the network device 110 may configure the ordering based on a wider frequency band (such as the full frequency band) to reduce complexity (for example, the system overhead). The embodiments and operations at the network device 110 will be described in detail below with reference to FIG. 4.

Figure 4:
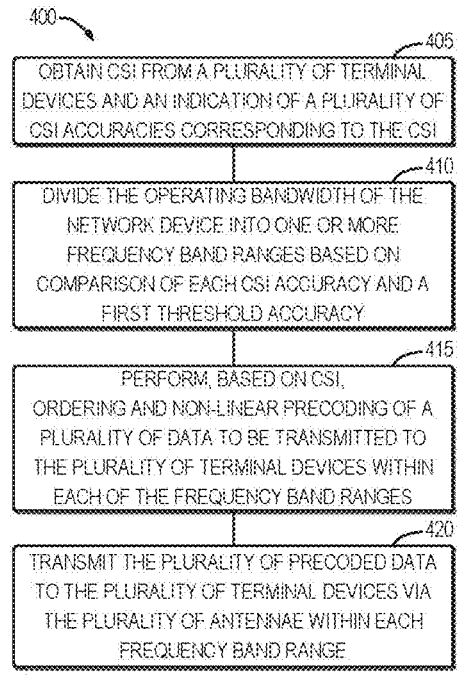
FIG. 4 illustrates a flowchart of an example method in accordance with some other embodiments of the present disclosure.

FIG. 4 is a flowchart of a method 400 in accordance with some embodiments of the present disclosure. The method 400 can be implemented at the network device 110. For the purpose of discussion, the method 400 will be described below with reference to FIG. 1.

At block 405, the network device 110 obtains the CSI from a plurality of terminal devices 120 and an indication of a plurality of CSI accuracies corresponding to the CSI. The CSI accuracy may be indicated by an index of 1~3 bits. In this way, the network device 110 may learn the accuracy level of each received CSI. In some embodiments, the network device 110 may transmit the indication of a required CSI accuracy to each terminal device 120. For example, the network device 110 may transmit the indication to each terminal device 120 in the physical downlink control channel (PDCCH). Alternatively, the network device 110 may also transmit the indication to the terminal device 120 in signaling at a higher layer signaling such as a radio resource control (RRC) layer, for instance. In response to this indication, the terminal device 120 may feed the indicated accuracy level of the CSI back to the network device 110.

In some embodiments, the network device 110 may require that the terminal device 120 to feed the CSI with the higher accuracy, for example, the CSI with an accuracy higher than a threshold accuracy (referred to as a "third threshold accuracy"). Accordingly, the terminal device 120 may feed the CSI with the high accuracy back to the network device 110. For example, the terminal device 120 may feed instantaneous complete CSI back as required by the network device 110.

At block 410, the network device 110 compares each CSI accuracy with a certain threshold accuracy (referred to as a "first threshold accuracy"). Based on this comparison, the network device 110 divides the whole operating bandwidth into one or more frequency band ranges. The specific value of the first threshold accuracy may be determined based on the actual requirement of the system performance (such as Signal to Noise Ratio). Any suitable number of frequency band ranges with any bandwidth may be employed, including, for example, the whole frequency band on which the network device 110 operates, a partial frequency band, or a single frequency band (or sub-band). As such, the network device 110 may make a response to the influence of CSI errors by selecting the size of the frequency band range based on the CSI accuracy so as to improve the system performance.

In some embodiments, the network device 110 may compare each CSI accuracy with the first threshold accuracy. If there are many CSI accuracies below the first threshold accuracy, for instance, the number of CSI accuracies below the first threshold accuracy is greater than a threshold number (referred to as a "first threshold number"), it means that the accuracies of the CSI fed back by these terminal devices 120 are not high. The first threshold number may be determined based on the actual requirements of the system performance. Then, the network device 110 may use each of the plurality of frequency bands as the frequency range to be used, to offset the influence of the CSI errors and improve the system performance.

In some embodiments, if the number of CSI accuracies below the first threshold accuracy is smaller than the first threshold number, the network device 110 may compare each CSI accuracy with another threshold accuracy (referred to as a "second threshold accuracy"). The second threshold accuracy is higher than the first threshold accuracy and its specific value may also be determined based on the actual requirements of the system performance (such as Signal to Noise Ratio). If there are many CSI accuracies higher than the second threshold accuracy, for example, the number of CSI accuracies higher than the second threshold accuracy is greater than another threshold number (referred to as a "second threshold number"), the network device 110 may select all the frequency bands. Moreover, the first threshold number and the second threshold number may or may not be the same. Thus, when the CSI accuracies of the terminal devices 120 are high, a wider frequency band may be used so as to further reduce complexity.

In some embodiments, if the number of CSI accuracies higher than the second threshold accuracy is smaller than the second threshold number, the network device 110 may select a partial frequency band. The specific number of partial frequency bands selected by the network device 110 may depend on the actual system requirements. In this way, a tradeoff between the system performance and the complexity (including the system overhead) may be achieved.

In some embodiments, after determining the frequency band range, the network device 110 may determine a level of the frequency band range based on the number of frequency band ranges. This level may be preconfigured in the network 100 and may be known to both the network device 110 and the terminal devices 120. Then, the network device 110 may transmit an indication of the determined level to the terminal devices 120 for the corresponding receiving by the terminal devices 120. The indication may be transmitted on the PDCCH or through high-layer signaling (such as RRC-layer signaling). As an example, when the frequency ranges include two levels, namely, a single frequency band and a full frequency band, 1 bit may be used for indication. For example, "0" represents full frequency band, while "1" denotes single frequency band. When the frequency ranges are divided into 3~4 levels, 2 bits may be used. For example, if the frequency ranges have more levels, more bits may be used.

At block 415, based on the obtained CSI, the network device 110 performs ordering and non-linear precoding of the data to be transmitted to the terminal devices 120 in the determined frequency band range. At block 420, the network device 110 transmits the precoded data to the terminal devices 120 via a plurality of antennas within the frequency band range.

The network device 110 may perform the ordering of data within the determined frequency band in any suitable manner. In some embodiments, the network device 110 may employ simple ordering to sort the data of the plurality of terminal devices 120 in a simple ordering way. For example, the data of the terminal device with the smallest channel gain is listed at the top while the data of the terminal device with the largest channel gain is listed at the bottom. Accordingly, when the network device 110 performs the precoding, the order of CSI in the matrix of channel characteristics H may be determined based on the order of data.

To further reduce the complexity and improve the system performance, in some embodiments, the network device 110 may perform the LQ decomposition to the matrix of channel characteristics H so that values of the diagonal elements in the lower triangular matrix L are sorted in a descending order, thereby determining the order of data of the individual terminal devices 120. For example, the network device 110 generates the matrix of channel characteristics H based on the CSI from the plurality of terminal devices 120, each row in the matrix of channel characteristics H corresponding to CSI of one terminal device 120. Then, the network device 110 may perform the LQ decomposition to the matrix of channel characteristics H so that values of diagonal elements in the lower triangular matrix L are sorted in a descending order.

The above LQ decomposition may be performed in any suitable manner. In some embodiments, the network device 110 may calculate matrices L and Q row by row. For example, the network device 110 may select the ith row vector from the matrix of channel characteristics H and i is a positive integer greater than 1 and smaller than or equal to M, where M represents the number of terminal devices 120. Then, the network device 110 calculates the ith row of the matrices L and Q with the selected ith row vector.

In some embodiments, the network device 110 may select rows in the matrix of channel characteristics H in sequence to calculate the corresponding rows in the matrices L and Q. To further improve system performance, in some embodiments, the network device 110 may select and utilize the row vector having the greatest scaler power in the matrix of channel characteristics H to derive the corresponding rows in the matrices L and Q. For example, the network device 110 may determine the row vector with the greatest scalar power from the row vectors to be decomposed in the matrix of channel characteristics H as the ith row vector.

After selecting the ith row of the matrix H, to sort the values of the diagonal elements of the generated matrix L in a descending order, the network device 110 may compare the diagonal element $l_{i,i}$ of the ith row of the currently calculated matrix L and the diagonal element $l_{i-1,i-1}$ of the previously calculated i−1th row. If $l_{i,i} > l_{i-1,i-1}$, the ith row vector is interchanged with the i−1th row vector in the matrix of channel characteristics H. Then, the network device 110 re-determines the i−1 th row vector in the unitary matrix Q and the i−1th row vector in the lower triangular matrix L based on the interchanged i−1th row vector in the matrix of channel characteristics H. Next, the network device 110 compares the diagonal element of the re-determined i−1th row vector in the lower triangular matrix L with the diagonal element of the i−2th row vector in the lower triangular vector L. If $l_{i-1,i-1} > l_{i-2,i-2}$, then the i−1th row vector and the i−2th row vector in the matrix of channel characteristics H are interchanged. If $l_{i-1,i-1} < l_{i-2,i-2}$, it continues to re-determine the ith row vector in the unitary matrix Q and the ith row vector in the lower triangular vector L based on the interchanged ith row vector in the matrix of channel characteristics H. Subsequently, the diagonal element $l_{i,i}$ of the re-determined ith row vector is compared with the diagonal element $l_{i-1,i-1}$ of the i−1th row vector determined last time. This process can continue until the complete matrices L and Q are obtained.

After the LQ decomposition is complete, the network device 110 may determine the order of CSI of the terminal devices 120 corresponding to each row in the decomposed matrix of channel characteristics H, and sort the data to be transmitted to the terminal devices 120 based on this order. Moreover, the network device 110 may also precode the sorted data with the obtained unitary vector Q and the lower triangular matrix L. For example, the network device 110 may determine the precoding matrix F=Q', the scaling matrix G=diag[$l_{11}^{-1}$, $l_{22}^{-1}$, . . . , $l_{MM}^{-1}$], and the feedback processing matrix B=GL.

In some embodiments, the network device 110 may transmit the determined scaling matrix G (including the receiving coefficients of the individual terminal devices 120) to each terminal device 120. For the ordering and precoding in a full frequency band, the network device 110 only needs to transmit the value of one receiving coefficient to each terminal device 120. If the ordering and precoding are performed in partial frequency band or a single frequency band, the network device 110 needs to transmit a plurality of values to the terminal devices 120. In the embodiment where the network device 110 indicates the determined frequency range to the terminal device 120, the terminal device 120 may determine the number of receiving coefficients to be received based on the indication of frequency range so as to receive data correctly.

In an embodiment, an example algorithm procedure of the LQ decomposition process of the matrix of channel characteristics H is as follows:

Input: H
Initialize: H = H' ; L = 0 ; Q = 0; Ω = [1,2,K ,M] ; $L_{max}$ = 1e5 ; k = 1
   Find an index $i_k$ so that $i_k$ = arg max$_i$ $\|H_i\|_2^2$;
   Interchange the first column with the $i_k$th column in H and Ω;
Repeat:
   For j = 1,2,K ,k − 1
     $l_{j,k}$ = $Q_j'H_k$ ;
     $H_k$ = $H_k - l_{j,k}Q_j$;
   End
   $l_{k,k}$ = $\|H_k\|_2^2$;
     If $l_{k,k}$ < $L_{max}$ ;
        $Q_k$ = $H_k/l_{kk}$ ;
        $L_{max}$ = $l_{k,k}$ ;
        k = k + 1 ;
        Find $i_k$ so that $i_k$ = arg max$_{k \leq i \leq M}$ $\|H_i\|_2^2$
        Interchange the kth column with the $i_k$th column in H and Ω;
     Else
        k = k − 1 ;
        Interchange the kth column with the following column in H and Ω;

$$L_{max} = \begin{cases} l_{k-1,k-1}, & k > 1 \\ 1e5, & k = 1 \end{cases}$$

End
Until k > M
Return: L = L' ; Q = Q'.

Such an ordered LQ decomposition algorithm may increase the values of diagonal elements so as to improve the receiving Signal to Noise Ratio. In addition, this algorithm can generate the lower triangular matrix L and the unitary matrix Q quickly with the computation complexity similar to the conventional QR process. Table 1 shows comparison of computation complexity between this algorithm and three other algorithms.

TABLE 1

| Algorithm | Conventional QR decomposition | Direct-ordering decomposition | Proposed ordered decomposition | Exhaustive-ordering decomposition |
|---|---|---|---|---|
| Complexity | O ($M^3$) | O ($M^3$) | O ($M^3$) | O ($M^3M!$) |

It can be seen that exhaustive searching has high complexity, thus being infeasible in practice. The proposed algorithm and the direct ordering algorithm and the conventional QR decomposition have comparable complexity.

Figure 5:
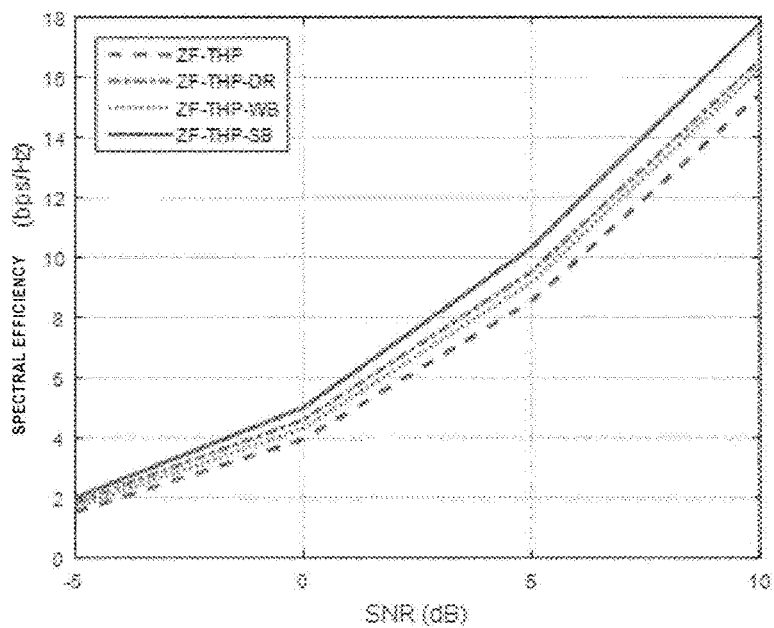
FIGS. 5 and 6 illustrate a comparison diagram of spectrum efficiency between an approach in accordance with embodiments of the present disclosure and a conventional approach.

FIG. 5 illustrates example performance comparison between the above ordered decomposition and other ordering algorithms when different frequency band ranges are selected. In this example, a multi-user system having eight terminal devices 120 is considered. For the sake of simplicity, it is assumed that all the terminal devices 120 have a single antenna and the network device 110 is equipped with 8 antennas. In FIG. 5, ZF-THP represents random ordering (no ordering), ZF-THP-DR represents the direct ordering algorithm with a sub-band ordering scheme, ZF-THP-WB represents the proposed ordering algorithm with a wideband ordering scheme; and ZF-THP-SB represents the proposed algorithm with a sub-band ordering scheme.

As shown in FIG. 5, significant performance gain is observable in the proposed ordering scheme. Specifically, the proposed ordering scheme has better performance than direct ordering algorithm while its complexity is similar to the conventional QR algorithm, and therefore, it serves as a good solution to the ordering problem. Moreover, compared with the wideband ordering scheme, sub-band ordering can provide better performance. For example, the wideband ordering using the proposed algorithm has similar performance to sub-band ordering using the direct ordering algorithm. Therefore, the design for different frequency range levels is necessary to balance the performance and the complexity.

Figure 6:
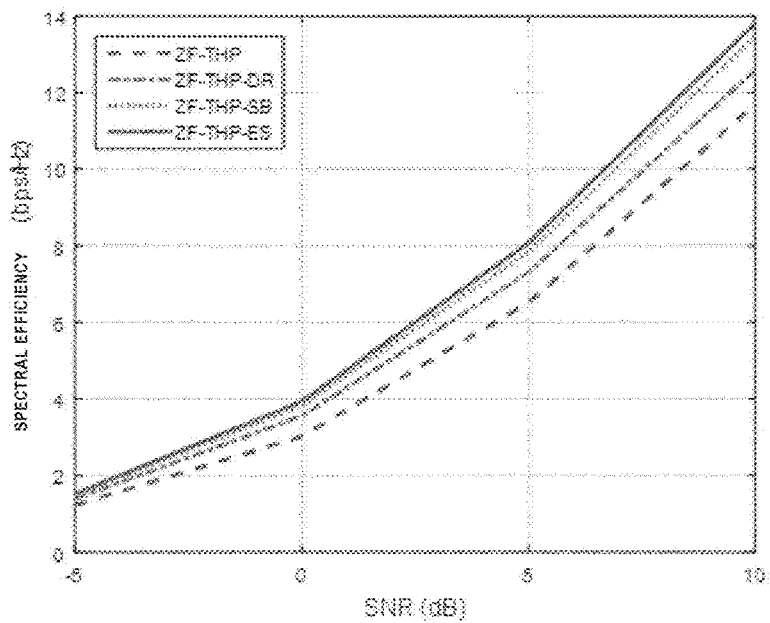

FIG. 6 illustrates example performance comparison of determining the ordering and precoding using the above ordered decomposition and other ordering algorithms when different frequency band ranges are selected. In this example, a 6×6 MIMO system is considered, that is, including 6 single-antenna terminal devices 120 and a network device 110 with 6 antennas.

In FIG. 6, ZF-THP represents the random ordering (no ordering), ZF-THP-DR represents the direct ordering algorithm with the sub-band ordering scheme, ZF-THP-SB represents the proposed algorithm with sub-band ordering scheme, and ZF-THP-ES represents an exhaustive searching approach with the sub-band ordering scheme. To achieve the performance result of the exhaustive search approach effectively, only a part of the whole bandwidth is processed. It can be seen that the proposed ordering algorithm may provide performance very similar to the exhaustive approach. Therefore, considering performance and complexity, the proposed ordered ordering algorithm is more implementable.

Figure 7:
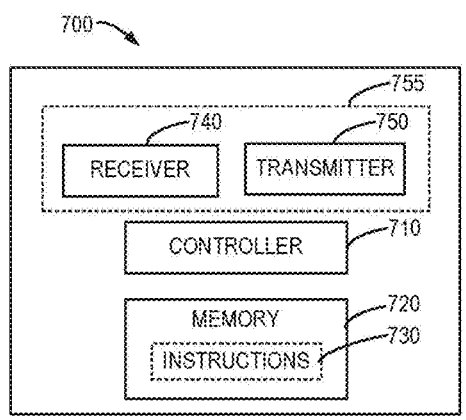
FIG. 7 is a block diagram of a device that is suitable for implementing embodiments of the present disclosure.

FIG. 7 is a block diagram of a device 700 that is suitable to implement embodiments of the present disclosure. The device 700 can be used to implement the network device 110 shown in FIG. 1.

As shown, the device 700 includes a controller 710 which controls the operation and function of the device 700. For example, in some embodiments, the controller 710 may implement various operations by means of instructions 730 stored in a memory 720 coupled to the controller 710. The memory 720 may be of any type suitable to the local technical network and may be implemented using any suitable data storage technology such as semiconductor based memory devices, magnetic memory devices and systems, optical memory devices and systems, as non-limiting examples. While only one memory unit is shown in FIG. 7, there may be several physically distinct memory units in the device 700.

The controller 710 may be of any type suitable to the local technical network, and may include one or more of general purpose computers, special purpose computers, microprocessors, digital signal processors (DSPs) and multicore controller architecture based on controller, as non-limiting examples. The device 700 may have a plurality of controller 710 coupled to the communication module 755 which includes a receiver 740 and a transmitter 750 that implement reception and transmission of information by means of one or more antennas and/or other components.

When the device 700 serves as the network device 110, the controller 710, the receiver 740 and the transmitter 750 may operate to perform the method 400 described above with reference to FIG. 4. All the features as described above with reference to FIGS. 1 to 6 are likewise applicable to the device 700 and will not be repeated here.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated or described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

As an example, embodiments of the present disclosure may be described in the context of computer-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor of a general purpose computer, special purpose computer, or other programmable data processing apparatus, such that the program codes, when executed by the computer or other programmable data processing apparatuses, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, computer readable medium may be any tangible medium that includes or stores a program for or about an instruction execution system, apparatus or device. The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

I claim:

1. A method implemented at a network device, the network device configured with a plurality of antennas and configured to operate in a plurality of frequency bands, the method comprising:
   obtaining channel state information, CSI, from a plurality of terminal devices and an indication of a plurality of CSI accuracies corresponding to the CSI;
   dividing a bandwidth of the plurality of frequency bands into one or more frequency band ranges based on comparison of each of the plurality of CSI accuracies and a first threshold accuracy;
   performing, based on the CSI, ordering and non-linear precoding of a plurality of data to be transmitted to the plurality of terminal devices within each of the frequency band ranges; and
   transmitting the plurality of precoded data to the plurality of terminal devices via the plurality of antennas within each of the frequency band ranges.

2. The method according to claim 1, wherein the performing the ordering and the non-linear precoding of the plurality of data based on the CSI comprises:
   generating a matrix of channel characteristics H based on the CSI, each row in the matrix of channel characteristics H corresponding to the CSI from one of the plurality of terminal devices;
   decomposing the matrix of channel characteristics H into a product of a unitary matrix Q and a lower triangular matrix L so that values of diagonal elements in the lower triangular matrix L are sorted in a descending order; and
   performing the ordering and the precoding of the plurality of data based on the decomposition.

3. The method according to claim 2, wherein a number of the plurality of terminal devices is M, M being a positive integer greater than 1, and decomposing the matrix of channel characteristics H into the product of the unitary matrix Q and the lower triangular matrix L comprises:
   selecting an ith row vector from the matrix of channel characteristics H, i being a positive integer greater than 1 and smaller than or equal to M;
   determining, based on the selected ith row vector, an ith row vector in the unitary matrix Q and an ith row vector in the lower triangular matrix L; and
   in response to a diagonal element $l_{i,i}$ of the ith row vector in the lower triangular matrix L being greater than a diagonal element $l_{i-1,i-1}$ of the i−1th row vector in the lower triangular matrix L, interchanging the ith row vector and an i−1th row vector in the matrix of channel characteristics H.

4. The method according to claim 3, further comprising:
   re-determining the i−1th row vector in the unitary matrix and the i−1th row vector in the lower triangular matrix L based on the interchanged i−1th row vector in the matrix of channel characteristics H; and
   in response to the diagonal element $l_{i-1,i-1}$ of the re-determined i−1th row vector in the lower triangular matrix L being greater than a diagonal element $l_{i-2,i-2}$ of an i−2th row vector in the lower triangular matrix L, interchanging the i−1th row vector and an i−2th row vector in the matrix of channel characteristics H.

5. The method according to claim 4, further comprising:
   in response to the diagonal element $l_{i-1,i-1}$ of the re-determined i−1th row vector in the lower triangular matrix L being smaller than the diagonal element $l_{i-2,i-2}$ of the i−2th row vector in the lower triangular matrix L, re-determining the ith row vector in the unitary matrix and the ith row vector in the lower triangular vector L based on the interchanged ith row vector in the matrix of channel characteristics H.

6. The method according to claim 3, wherein selecting the ith row vector from the matrix of channel characteristics H comprises:
   determining, from a row vector to be decomposed in the matrix of channel characteristics H, a row vector with a largest scaler power as the ith row vector.

7. The method according to claim 2, wherein performing the ordering and the precoding of the plurality of data based on the decomposition comprises:
   determining an order of the CSI from the plurality of terminal devices corresponding to each row in the decomposed matrix of channel characteristics H;
   sorting the plurality of data to be transmitted to the plurality of terminal devices based on the determined order; and
   precoding the plurality of sorted data using the unitary matrix Q and the lower triangular matrix L.

8. The method according to claim 7, further comprising:
   determining respective receiving coefficients of the plurality of terminal devices based on the lower triangular matrix L; and
   indicating the respective receiving coefficients to the plurality of terminal devices.

9. The method according to claim 1, wherein the dividing the bandwidth of plurality of frequency bands into the one or more frequency band ranges comprises:
   comparing each of the plurality of CSI accuracies with the first threshold accuracy; and
   in response to a number of the CSI accuracies below the first threshold accuracy being greater than a first threshold number, determining each of the plurality of frequency bands as a frequency band range of the plurality of frequency ranges.

10. The method according to claim 9, wherein the dividing the bandwidth of the plurality of frequency bands into the one or more frequency band ranges further comprises:
    in response to the number of the CSI accuracies below the first threshold accuracy being smaller than the first threshold number, comparing each of the plurality of CSI accuracies with a second threshold accuracy, the first threshold accuracy being lower than the second threshold accuracy; and
    in response to the number of the CSI accuracies higher than the second threshold accuracy being greater than a second threshold number, determining all of the frequency bands as the frequency range.

11. The method according to claim 10, wherein the dividing the bandwidth of the plurality of frequency bands into the one or more frequency band ranges further comprises:
    in response to the number of the CSI accuracies higher than the second threshold accuracy being smaller than the second threshold number, determining that each frequency band range in the plurality of frequency ranges includes a partial frequency band in the plurality of frequency bands.

12. The method according to claim 1, further comprising:
transmitting, to the plurality of terminal devices, an indication to require the plurality of terminal devices to feed the CSI with the CSI accuracies higher than a third threshold accuracy.

13. The method according to claim 1, further comprising:
transmitting, to the plurality of terminal devices, an indication to require the plurality of terminal devices to report the plurality of CSI accuracies.

14. The method according to claim 1, further comprising:
determining a level of the frequency band range based on the number of the frequency band ranges; and
indicating the determined level to the plurality of terminal devices.

15. The method according to claim 14, wherein the level is indicated with one or more bits.

16. A network device configured with a plurality of antennas and configured to operate in a plurality of frequency bands, the network device comprising:
a receiver configured to obtain channel state information, CSI, from a plurality of terminal devices and an indication of a plurality of CSI accuracies corresponding to the CSI;
a controller configured to,
divide a bandwidth of the plurality of frequency bands into one or more frequency band ranges based on comparison of each of the plurality of CSI accuracies and a first threshold accuracy, and
perform, based on the CSI, ordering and non-linear precoding of a plurality of data to be transmitted to the plurality of terminal devices within each of the frequency band ranges; and
a transmitter configured to transmit, within each of the frequency band ranges, the plurality of precoded data to the plurality of terminal devices via the plurality of antennas.

17. The network device according to claim 16, wherein the controller is configured to:
generate a matrix of channel characteristics H based on the CSI, each row in the matrix of channel characteristics H corresponding to the CSI from one of the plurality of terminal devices;
decompose the matrix of channel characteristics H into a product of a unitary matrix Q and a lower triangular matrix L so that values of diagonal elements in the lower triangular matrix L are sorted in a descending order; and
perform the ordering and the precoding of the plurality of data based on the decomposition.

18. The network device according to claim 17, wherein a number of the plurality of terminal devices is M, M being a positive integer greater than 1, and the controller is configured to:
select an ith row vector from the matrix of channel characteristics H, i being a positive integer greater than 1 and smaller than or equal to M;
determine, based on the selected ith row vector, an ith row vector in the unitary matrix Q and an ith row vector in the lower triangular matrix L; and
in response to a diagonal element $l_{i,i}$ of an ith row vector in the lower triangular matrix L being greater than a diagonal element $l_{i-1,i-1}$ of the i-1th row vector in the lower triangular matrix L, interchanging an ith row vector and an i-1th row vector in the matrix of channel characteristics H.

19. The network device according to claim 18, wherein the controller is further configured to:

re-determine the i-1th row vector in the unitary matrix Q and the i-1th row vector in the lower triangular matrix L based on the interchanged i-1th row vector; and
in response to the diagonal element $l_{i-1,i-1}$ of the re-determined i-1th row vector in the lower triangular matrix L being greater than a diagonal element $l_{i-2,i-2}$ of an i-2th row vector in the lower triangular matrix L, interchange the i-1th row vector and an i-2th row vector in the matrix of channel characteristics H.

20. The network device according to claim 19, wherein the controller is further configured to:
in response to the diagonal element $l_{i-1,i-1}$ of the re-determined row vector in the lower triangular matrix L being smaller than the diagonal element $l_{i-2,i-2}$ of the i-2th row vector in the lower triangular matrix L, re-determine the ith row vector in the unitary matrix Q and the ith row vector in the lower triangular vector L based on interchanged ith row vector in the matrix of channel characteristics H.

21. The network device according to claim 18, wherein the controller is configured to:
determine, from a row vector to be decomposed in the matrix of channel characteristics H, a row vector with a largest scaler power as the ith row vector.

22. The network device according to claim 17, wherein the controller is configured to:
determine an order of the CSI from the plurality of terminal devices corresponding to each row in the decomposed matrix of channel characteristics H;
sort the plurality of data to be transmitted to the plurality of terminal devices based on the determined order; and
precode the plurality of sorted data using the unitary matrix Q and the lower triangular matrix L.

23. The network device according to claim 22, wherein the controller is further configured to determine respective receiving coefficients of the plurality of terminal devices based on the lower triangular matrix L; and
wherein the transmitter is further configured to indicate the respective receiving coefficients to the plurality of terminal devices.

24. The network device according to claim 16, wherein the controller is configured to:
compare each of the plurality of CSI accuracies with the first threshold accuracy; and
in response to a number of the CSI accuracies below the first threshold accuracy being greater than a first threshold number, determining each of the plurality of frequency bands as a frequency band range of the plurality of frequency ranges.

25. The network device according to claim 24, wherein the controller is further configured to:
in response to the number of the CSI accuracies below the first threshold accuracy being smaller than the first threshold number, compare each of the plurality of CSI accuracies with a second threshold accuracy, the first threshold accuracy being lower than the second threshold accuracy; and
in response to the number of the CSI accuracies higher than the second threshold accuracy being greater than a second threshold number, determining all of the frequency bands as the frequency range.

26. The network device according to claim 25, wherein the controller is further configured to:
in response to the number of the CSI accuracies higher than the second threshold accuracy being smaller than the second threshold number, determine that each frequency band range in the frequency ranges includes a partial frequency band in the plurality of frequency bands.

27. The network device according to claim 16, wherein the transmitter is further configured to:
   transmit, to the plurality of terminal devices, an indication to require the plurality of terminal devices to feed the CSI with the CSI accuracies higher than a third threshold accuracy.

28. The network device according to claim 16, wherein the transmitter is further configured to:
   transmit, to the plurality of terminal devices, an indication to require the plurality of terminal devices to report the plurality of CSI accuracies.

29. The network device according to claim 16, wherein the controller is further configured to determine a level of the frequency band range based on the number of the frequency band ranges; and
   wherein the transmitter is further configured to indicate the determined level to the plurality of terminal devices.

30. The network device according to claim 29, wherein the level is indicated with one or more bits.

31. A network device, comprising:
   a processor; and
   a memory including instructions which, when executed by the processor, cause the network device to perform the method according to claim 1.

32. A non-transitory computer readable storage medium storing a computer program, which when executed by a processor, cause the processor to perform the method according to claim 1.

* * * * *